3,819,694
6-[2-(3-HYDROXYALKYL) - 3,5 - DISUBSTITUTED-PHENYL]HEXANOIC ACIDS AND SALTS THEREOF
Eugene E. Galantay, Morristown, N.J., assignor to Sandoz-Wander, Inc., Hanover, N.J.
No Drawing. Filed Nov. 22, 1971, Ser. No. 201,161
Int. Cl. C07c 65/20, 65/02
U.S. Cl. 260—521 R  7 Claims

ABSTRACT OF THE DISCLOSURE

The invention discloses compounds of the formula:

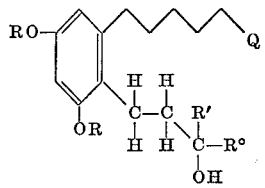

in which Q is —CH$_2$OH or —COOR''; R° is straight chain lower alkyl (C$_4$–C$_6$; R' is hydrogen or alkyl; and R'' is hydrogen or a cation forming pharmaceutically acceptable salt, e.g., 6 - [2 - (3 - hydroxyoctyl) - 3,5 - dimethoxyphenyl]hexanoic acid and its sodium salt, said compounds being useful as pharmaceutical agents, e.g., as bronchodilators. The above final products where R' is hydrogen may be prepared by catalytic hydrogenation of a corresponding 1-[2',4' - disubstituted-6'ω-substituted-hexyl - 1' - phenyl]-1-olefin-3-one, by reduction of novel intermediates which are 6-[3,5 - disubstituted - 2 - (2-alkanoylethyl)phenyl]hexanoic acid and hexanols which may be obtained from the above-mentioned catalytic hydrogenation and, where R' is alkyl, by reaction of the last named hexanoic acid and hexanols with a Grignard reagent, said novel intermediates being similarly useful as pharmaceutical agents.

---

The present invention relates to chemical compounds, and more particularly to compounds which are 6-[2-(3-hydroxyalkyl) - 3,5 - disubstitutedphenyl]hexanoic acids and hexanols. The invention also relates to intermediates and to pharmaceutical compositions and pharmaceutical methods utilizing the pharmacological properties of said compounds.

The compounds of the present invention may be represented by the following formula I:

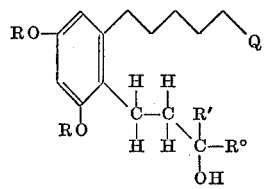

wherein
R° is straight chain alkyl of 4 to 6 carbon atoms, i.e., butyl, pentyl or hexyl,
Q is —CH$_2$OH or —COOR'',
R'' is hydrogen or a cation forming a pharmaceutically acceptable salt,
R' is hydrogen or lower alkyl of 1 to 3 carbon atoms, and both R's which are the same, are hydrogen or lower alkyl of 1 to 3 carbon atoms.

The compounds of the formula I in which R' is hydrogen may be prepared in a Step 1 reaction by subjecting a compound of the formula II:

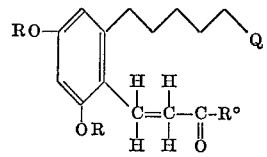

wherein R°, R and Q are as defined, to reduction in a known manner.

The compounds of the formula I in which R' is hydrogen may also be prepared in a Step 2 reaction by subjecting a compound of the above formula II or a compound of the following formula III:

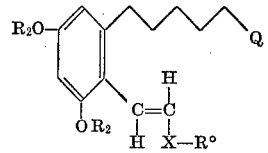

wherein R° and Q are as defined and R$_2$ is hydrogen, alkyl of 1 to 3 carbon atoms or benzyl and X is

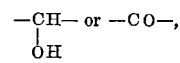

to catalytic hydrogenation in an inert solvent. The compounds of the formula III in which R$_2$ is benzyl are novel and first disclosed by me herein while the other compounds are disclosed in co-filed application Ser. No. 201,-109 and its now abandoned prior parent application Ser. No. 86,270, filed Nov. 2, 1970.

The compounds of the formula I in which R' is alkyl may be prepared in a Step 3 reaction involving reacting a compound of the above formula II with a Grignard compound of the formula IV:

  IV wherein R''' is alkyl of 1 to 3 carbon atoms and Y is bromo or iodo.

The compound of the formula I in which R' is alkyl and Q is —COOH are, however, preferably in a Step 4 reaction involving subjecting a compound of the formula Ia:

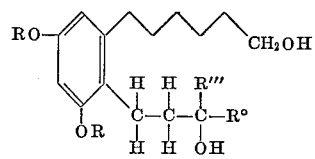  Ia wherein R°, R and R''' are as defined, to complete terminal oxidation in a known manner.

The preparation of compounds I in which R' is hydrogen by the reduction reaction of Step 1 is conveniently carried out at temperatures in the range of from minus 70° C. to plus 30° C., preferably between minus 10° C. to plus 10° C. employing an alkali metal borohydride as reducing agent, preferably sodium borohydride. The inert solvent is conveniently water which contains a sufficient amount of an alkali metal hydroxide such as sodium hydroxide to neutralize the acid function when Q is —COOH.

The preparation of compounds I in which R' is hydrogen from a compound of the formula II and/or III by the catalytic hydrogenation of Step 2 may be carried out over a fairly wide temperature range of from 10° C. to 80° C., preferably 15° C. to 30° C. The hydrogenation catalyst may be of known type, preferably palladium supported on carbon, e.g., a catalyst comprising 3–12% palladium on 88–97% charcoal. The hydrogenation is conducted in the presence of an inert solvent which is suitably water and/or a lower alcohol such as ethanol. When $R_2$ in the compound III is benzyl, the hydrogenation is readily conducted to effect removal of the benzyl moiety and form the compound of the formula I in which R is hydrogen. When starting with a compound of the formula II or a compound of the formula III in which X is —CO—, the hydrogenation is usually conducted for extended time period to convert such carbonyl group to the sought for alcohol as indicated, for example, by the hydrogen uptake, although in general this reaction is incomplete and leads to mixtures of the desired product and a compound of the formula II which may be separated from the desired product as desired or required. It will thus also be evident that the Step 2 reaction commencing with a compound of the formula III provides a convenient and preferred method of preparation of the compounds of the formula II, simply by controlling the hydrogenation, for example, by controlling the uptake of hydrogen, to favor the formation of compounds II and minimize the formation of compounds I. Any mixture of compounds II and I produced thereby may be used in Step 1 directly or, alternately, the compound II may be separated from the compound I prior to the Step 1 reaction.

The preparation of compounds I in which R' is alkyl by Step 3 involves a conventional Grignard reaction which may be carried out at temperatures of from minus 10° C., to plus 80° C., followed by hydrolysis in a conventional manner. The reaction is conducted in an inert organic solvent of conventional type for Grignard reactions such as an ether, for example, tetrahydrofuran, dioxane or diethyl ether.

The reaction of Step 4 is suitably effected in a known manner employing oxidizing agents suitable for converting an aliphatic alcohol to the corresponding acid. In general, the oxidation may be carried out at temperature in the range of from 10° C. to 100° C. and in the presence of an inert organic solvent of conventional type. The process is preferably carried out by oxidation of a compound Ia employing chromic acid/sulfuric acid (Jones Reagent) as the oxidizing agent and a ketone, e.g., acetone, as the solvent. Preferred temperatures for such oxidation are in the range of from 15° C. to 40° C. In general, the reaction products produced by the reaction of Steps 1–4 may be isolated from the respective reaction mixtures in which they are formed by working up by established procedures.

Certain of the compounds of the formula III having the formula IIIa:

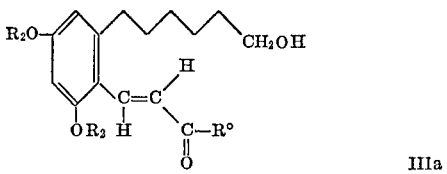

in which $R_2$ and $R^\circ$ are as defined above, are preferably prepared in a Step A reaction involving the reaction of a compound of the formula V:

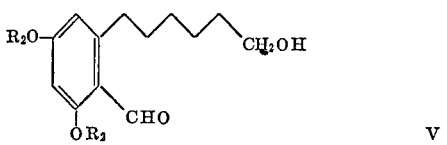

in which $R_2$ is as above defined, with a compound of the formula VI:

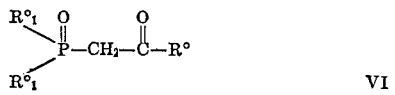

in which $R^\circ$ is as defined and each $R^\circ_1$ is lower alkyl of 1 to 3 carbon atoms, while protecting the 6-ω-hydroxyhexyl moiety in a known manner, and followed by removal of the protection to obtain a compound of the formula IIIa.

The compounds of the formula III having the formula IIIb:

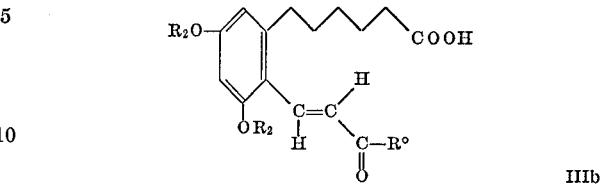

in which $R^\circ$ and $R_2$ are as defined, are preferably prepared in a Step B–1 or B–2 reaction involving the subjecting, respectively, of a compound of the formula IIIa or IIIc:

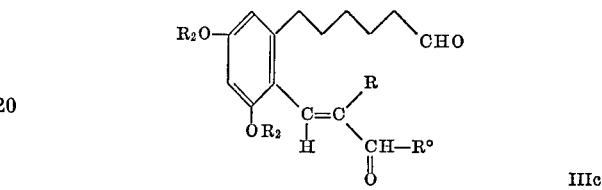

in which $R^\circ$ and $R_2$ are as defined, to complete terminal oxidation in a known manner.

The compounds of the formula III having the formula IIId:

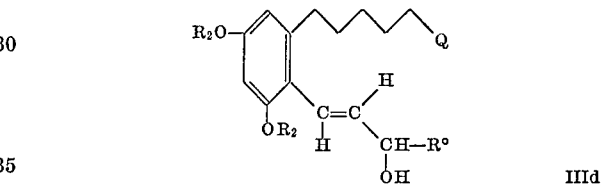

in which $R^\circ$, $R_2$ and Q are as defined, are preferably prepared in a Step C reaction involving the reduction of a compound of the formulae IIIa or IIIb in a known manner.

The Step A reaction involving the reaction of a compound V with a compound VI is preferably effected in three parts involving the protection of the hydroxyl group or groups on the compound of the formula V followed by the reaction of the protected compound V with the compound VI and finally the removal of the protecting group(s) to obtained the desired compound of the formula IIIa. The preparation of the protected compound V may be effected in a known manner, preferably by reacting the compound with a suitable reagent to provide a protective group for a hydroxyl group, e.g., trimethyl chlorosilane. The reaction is suitably effected at temperatures in the range of from minus 15° C. to plus 25° C., more suitably from minus 5° C. to plus 10° C., in the presence of a base and inert organic solvent. The base is conveniently pyridine which also serves as solvent for the reaction. The protected compound V is preferably isolated as an oil for use in the next olefin-formation step in which the protected compound V is reacted with the compound VI. The reaction of the protected compound V with the compound VI is suitably carried out in a known manner with the aid of a strong base, e.g., sodium hydroxide, which is preferably first reacted with the compound VI followed by combining the resulting reaction product with the protected compound V. The olefin-formation is conveniently effected at elevated temperatures in the range of from 30° C. to 100° C., preferably 40° C. to 80° C., and in the presence of an inert organic solvent of known type, preferably an ether such as dimethoxyethane. The protected reaction product of the formula IIIa is then subjected to reaction in a known manner to remove the protecting groups(s) and form the compound of the formula IIIa. Such "deprotection" reaction may be conveniently effected without isolation of the protected reaction product and is suitably carried out employing a strong acid, e.g., sulfuric acid, at temperatures in the range of from minus 10° C. to plus 50° C., more suitably at from 0° C. to 30° C. It will be evident that the Step A reaction may be varied as desired or required to produce various of the products of the formula IIIa. For example, when R is hydrogen a three-fold amount of protecting compound is desirably employed to protect all three hydroxyl groups on the compound of the formula V. In general, the reaction product of the formula IIIa may be isolated and recovered by working up by established procedures.

The reaction of Step B-1 and B-2 are suitably effected in a known manner employing oxidizing agents suitable for converting an aliphatic alcohol or aldehyde to the corresponding acid. In general, the oxidation may be carried out at temperatures in the range of from 10° C. to 100° C. and in the presence of an inert organic solvent of conventional type. The compounds IIIb are preferably prepared by oxidation of a compound IIIa employing chromic acid/sulfuric acid (Jones Reagent) as the agent and a ketone, e.g. actone, as the solvent. Preferred temperatures for such oxidation are in the range of from 15° C. to 40° C. The preparation of compounds IIIb from compounds IIIc is preferably effected employing silver hydroxide as the oxidizing agent and an alcoholic solvent, e.g., ethanol. The reaction product of the formula IIIb may be isolated and recovered from the reaction mixture of Steps B-1 and B-2 by working up by conventional procedures.

The reaction of Step C is a conventional ketone reduction suitably carried out at temperatures in the range of from 0° C. to 80° C., conveniently at from 10° C. to 35° C. The reduction is effected in a solvent medium, which depending upon the starting compound, is preferably water and/or a lower alcohol. The preferred reducing agents are the alkali metal borohydrides such as sodium borohydride and lithium borohydride. The reaction product of the formula IIId may be isolated and recovered from the reaction mixture of Step C by working up by established procedures, and when Q is —COOR'' in the starting compound, it will be evident that the reaction product may be recovered in the form of an alkali metal salt and such salt converted to the corresponding free acid or other salts, as desired, by conventional procedures.

The compounds of the formula IIIc, above, i.e.:

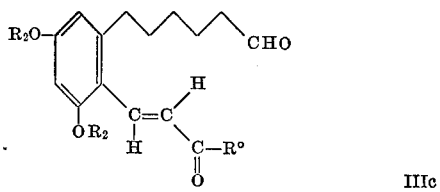

IIIc in which R° and $R_2$ are as defined, are preferably prepared in a Step D reaction involving the subjecting of a compound of the formula IIIa controlled terminal oxidation in a known manner.

The reaction of Step D is a controlled oxidation which may be suitably effected in a known manner employing, for example, silver carbonate on celite as the oxidizing agent and elevated temperatures in the range of from 30° C. to 120° C., preferably 50° C. to 100° C. Alternately, the oxidation may be carried out with a suitable metallic alkoxide, e.g., aluminum triisopropoxide, in accordance with the known Oppenauer oxidation. The oxidation, in general, is effected in the presence of an inert organic solvent of conventional type, preferably an aromatic solvent such as benzene and the like. The reaction product of the formula IIIc may be isolated and recovered from the reaction mixture of Step D by working up by conventional procedures.

The compounds of the formula V employed as starting material in the Step A reaction may be prepared by subjecting a compound of the formula VII:

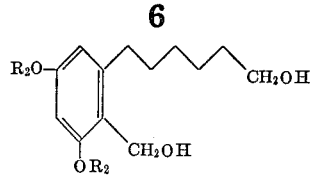

VII wherein $R_2$ is as above defined to "benzylic oxidation" in a known manner to obtain a compound of the formula V:

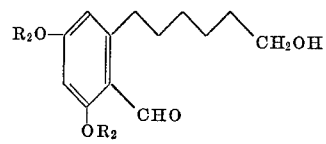

V in which $R_2$ is as above defined. Such preparation of the compounds V is suitably effected at temperatures in the range of from minus 10° C. to plus 60° C., conveniently at about room temperature. The reaction is carried out in an inert organic solvent of known type, preferably an ether such as dioxane. Suitable oxidizing agents for effecting such selective oxidation are known and include dichlorodicyanoquinone and manganese dioxide, preferably dichlorodicyanoquinone. The reaction product of the formula V may be isolated and recovered by working up by conventional procedures.

The compounds of the formula VII may be prepared by subjecting a compound of the formula VIII:

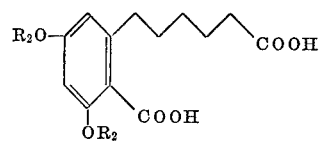

VIII in which $R_2$ is as defined, to reduction in a known manner employing metalic hydrides of the type suitable for reducing a carboxylic acid to the corresponding alcohol, preferably lithium aluminum hydride. The reduction is suitably carried out at temperatures of from 0° C. to 80° C., more suitably 10° C. to 30° C. and in the presence of an inert organic solvent of conventional type, preferably an ether such as tetrahydrofuran. The reaction product of the formula VII may be isolated from the resulting reaction mixture by working up by conventional procedures.

The compounds of the formula VIII employed as startting material in the preparation of compounds VII are either known per se or may be prepared from known materials by available procedures.

In preparing the compounds of the formulae I and II in which R is hydrogen, it is generally preferred to employ a compound III in which $R_2$ is benzyl and remove such benzyl group by the hydrogenation reaction of Step 2. It will be evident, however, that the other intermediates of the formulae V, VII and VIII in which $R_2$ is other than hydrogen may be converted by known procedures to the corresponding intermediate in which $R_2$ is hydrogen. For example, the compound of the formula V in which $R_2$ is hydrogen and having the formula Va:

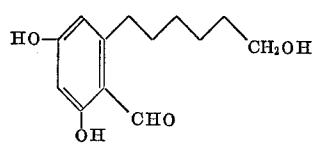

Va may be also produced by subjecting a compound of the formula V in which $R_2$ is alkyl to dealkylation in a known manner. Such preparation, which is preferably a demethylation, is preferably effected with a boron trihalide, e.g., boron trichloride or boron tribromide, in an inert organic solvent of conventional type, e.g., methylene chloride. The dealkylation may be suitably effected at temperatures in the range of from minus 80° C. to plus 40° C., more suitably at temperature of from minus 10° C. to plus 30° C.

Alternately, the intermediates of formulae V and VIII in which $R_2$ is benzyl may be converted to the corresponding compounds in which $R_2$ is hydrogen in a known manner, for example, by employing the catalytic hydrogenation reaction of Step 2. The compound of the formula V in which $R_2$ is hydrogen (i.e. compound Va) may also be obtained from the compound V in which $R_2$ is benzyl by subjecting the latter to acid catalysis involving reaction with hydrogen bromide in glacial acetic acid at temperatures of from 10° C. to 100° C., preferably 20° C. to 80° C. In this procedure, the ω-hydroxy group may be to some extent esterified but can be readily restored, e.g. by subsequent treatment with silver acetate and potassium hydroxide.

Conversely, the compounds of the formula V in which R is alkyl may also be produced by subjecting a compound of the formula Va to "phenolic alkylation" in a known manner such as by reacting the compound Va with a compound of the formula IXa or IXb:

or

in which $R_3$ is alkyl of 1 to 3 carbon atoms, in an alcoholic solvent, e.g., t-butanol or ethanol, and in the presence of a base, e.g., an alkali metal hydroxide. The resulting reaction product may be isolated by conventional procedures.

The compounds of the formula I in which Q is —COOH form salts and the pharmaceutically acceptable salts thereof are included within the scope of the pharmaceutically useful compound of the present invention. Such salts forming pharmaceutically acceptable compounds of the formula I include, by way of illustration, the sodium salt and the triethyl ammonium salt. In general, the salts may be produced from the free acids by established procedures. Conversely, the free acids may be obtained from the salts by well-known procedures.

The compounds of structural formula I and formula II are useful because they possess pharmacological activity in animals. In particular, thec ompounds are useful as hypotensive agents, as indicated by a lowering a blood pressure on intravenous administration to the anesthetized dog. For the above use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compounds used and the mode of administration. However, in general, satisfactory results are obtained when administered at a daily dosage of from about .6 milligram to about 30 milligrams per kilogram of body weight, preferably given in divided doses 2 to 4 times a day, or in sustained release form. For most mammals the administration of from about 40 milligrams to about 1000 milligrams of the compound per day provides satisfactory results and dosage forms suitable for internal administration comprise from about 10 milligrams to about 500 milligrams of the compound in admixture with a solid or liquid pharmaceutical carrier or diluent.

The compounds of the Formula I and formula II are also useful as bronchodilator agents as indicated by observing the respiratory status on oral administration to the unanesthetized guinea pig exposed to aerosolized histamine dihydrochloride according to a modification of the method of Van Arman et al., J. Pharmacol. Exptl. Therap. 133: 90–97, 1961. For such use an depending on the daily administration of from 0.6 to 100 milligrams per kilogram of body weight, preferably given in divided doses 2 to 4 times a day, or in sustained release form. For most mammals the administration of from 40 to 3000 milligrams per day provides satisfactory results and dosage forms suitable for internal administration comprise 10 to 1500 milliagrams of the compound in admixture with a solid or liquid pharmaceutical carrier or diluent.

The compounds I and II may be combined with a pharmaceutically acceptable carrier, and such other conventional adjuvants as may be necessary, and administered orally or parenterally for use as hypotensives and orally or by inhalation therapy as bronchodilators. Oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, biding agents, e.g., starch, gelatin and acacia, and lubricating agents, e.g., magnesium stearate, stearic acid and talc. The tablets may be uncoated or coated by known techniques to delay distintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of oral administration are solid compositions, particularly hard-filled capsules and tablets. Parenteral administration may be in such conventional forms as injectionable solutions and suspensions.

A representative formulation is a tablet for oral administration 2 to 4 times a day for prophylatic treatment of bronchial asthma and prepared by conventional tabletting techniques to contain the following ingredients:

| Ingredients: | Weight (mg.) |
| --- | --- |
| 6 - [2 - (3 - hydroxyoctyl) - 3,5 - dimethoxyphenyl]hexanoic acid sodium salt | 25 |
| tragacanth | 10 |
| lactose | 222.5 |
| corn starch | 25 |
| talcum | 15 |
| magnesium stearate | 2.5 |

The compound of the formulae I and II may be administered as bronchodilators by inhalation therapy in a conventional manner, e.g. by the use of nebulizers, vaporizers, aerosols and the like. Compositions for use in administration by inhalation therapy may be prepared accordingly to conventional procedures and contain the usual conventional ingredients employed in such compositions. A representative aerosol formulation prepared by conventional techniques for use with a metered value system contains the following ingredients:

| Ingredients: | Weight (mg.) |
| --- | --- |
| 6 - [2 - (3 - hydroxyoctyl) - 3,5 - dimethoxyphenyl]hexanoic acid sodium salt | 0.4–20% |
| Ethyl alcohol | 10–40% |
| Ascorbic acid | 1–10% |
| Freon 11 | 10–30% |
| Freon 114 | 10–30% |
| Freon 12 | 30–60% |
| Buffer System—pH control q.s. | |
| Flavor q.s. | |

The following examples show repersentative compounds encompassed within the scope of this invention and the manner in which such compounds are prepared. However, it is to be understood that the examples are for purposes of illustration only.

EXAMPLE 1

6-[3,5-dimethoxy-2-(hexanoylethyl)phenyl]hexanoic acid

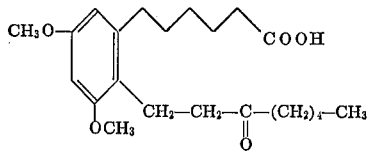

STEP A

Preparation of 4-hydroxyemthyl-5-ω-hydroxyhexyl-1,3-dimethoxy benzene

To a refluxing stirred mixture of 16.5 g. of lithium aluminum hydride in 200 ml. of dry tetrahydrofuran, there is dropwise added a solution of 43. g. of 6-ω-carboxypentyl-2,4-dimethoxybenzoic acid. After 3 hours the mixture is cooled in ice-water and dropwise treated with 47 ml. of 2N aqueous NaOH. The solids are filtered and thoroughly washed with chloroform. The combined organic layers are dried over sodium sulfate and evaporated to an oil. The title product is then obtained by distilling the oil (pressure: 0.01 mm., bath temperature 230–260°) and triturating the viscous distillate with diethyl ether to crystallize 4-hydroxymethyl-5-ω-hydroxyhexyl-1,3-dimethoxy benzene, m.p. 75–78° C.

STEP B

Preparation of 6-ω-hydroxyhexyl-2,4-dimethoxy-benzaldehyde

A solution of 1.34 g. of the product of Step A dissolved in 5 ml. of dioxane is mixed with a solution of 1.36 g. of dichloro-dicyanoquinone in 5 ml. of dioxane. After 3 hours at room temperature, the mixture is filtered through celite and evaporated to dryness. The residue is purified by chromatography using silica gel and methanol/chloroform (4:96) and crystallization from diethyl ether to obtain 6-ω-hydroxyhexyl-2,4-dimethoxybenzaldehyde, m.p. 80–82.5° C.

STEP C

Preparation of 1-[2',4'-dimethoxy-6'-ω-hydroxyhexyl-1'-phenyl]-1-octen-3-one

PART A

Protection Step: A solution of 650 mg. of product of Step B in 1.1 ml. of dry pyridine is cooled to 0° C. and treated with 0.35 ml. of trimethyl chlorosilane. After 20 minutes at 0° C., the mixture is evaporated to dryness, the residue is taken up in toluene and the toluene solution is washed 4 times with ice cold saturated aqueous cupric sulfate solution, then 4 times with ice cold brine. After drying over sodium sulfate, the solution is evaporated to dryness to obtain an oil of O-trimethylsilylated starting material.

PART B

Olefin-formation and Deprotection: Sodium hydride prepared by washing 99.8 mg. of a commercially obtained 57% suspension of sodium hydride with petroleum ether is suspended in 4.8 ml. of dry dimethoxyethane and to this mixture is added 0.535 g. of dimethyl-2-oxoheptyl phosphorane. The resulting mixture is stirred under ambient conditions until hydrogen evolution has ceased and there is then added thereto a solution of the O-trimethylsilylated material obtained in Part A in 1.0 ml. of dimethoxyethane. The resulting mixture is heated under reflux for 18 hours, cooled, and treated by addition of 2 ml. of 25% sulfuric acid to remove the protecting group. After holding for 30 minutes ice-water is added followed by extraction with diethyl ether and then short path distillation (200° C./0.01 mm.) to obtain an oil of 1-[2',4'-dimethoxy-6'-ω-hydroxyhexyl-1'-phenyl] - 1 - octen-3-one.

STEP D

Preparation of 1-[2',4'-dimethoxy-6'-ω-carboxyphenyl-1'-phenyl]-1-octen-3-one

To a solution of 348 mg. of the final product of Step C in 35 ml. of acetone is added 0.42 ml. of a mixture of chromic acid/sulfuric acid (Jones Reagent). After one hour at room temperature 10 ml. of isopropyl alcohol is added followed by the addition of 0.8 g. of sodium bicarbonate. The inorganic solids are filtered off and 30 ml. of water added to the filtrate followed by concentration in vacuo to a volume of about 30 ml. This residue is extracted with diethyl ether and the aqueous layer acidified with 5N aqueous hydrochloric acid solution to about pH 2 followed by extraction with ethyl acetate. The ethyl acetate extract is washed with water, dried and evaporated in vacuo to obtain a viscous oil which crystallized on standing to give 1 - [2',4' - dimethoxy-6'-ω-carboxylpentyl-1'-phenyl]-1-octen-3-one; m.p. 38° C.

STEP E

Preparation of 6-[3,5-dimethoxy-2-(hexanoylethyl)phenyl]hexanoic acid

A solution of 14.0 g. of the product of Step D in 37.3 ml. of 1N aqueous sodium hydroxide is added to a suspension of 0.8 g. of prehydrogenated Pd/C (10%) catalyst in 84 ml. of water and shaken in a hydrogen atmosphere (755 mm.) until I equivalent of hydrogen has been absorbed. After filtration, the solution is acidified to pH 1 with 2N HCl and extracted with ethyl acetate. The extract is concentrated in vacuo to a small to isolate the crude product. A minor portion of the crude gum-like product is purified by chromatography using a silica gel chromatoplate developed with chloroform/methanol (95:5) and eluting the least polar band ($R_f$ about 0.6) with ethyl acetate to obtain a pure oil of 6-[3,5-dimethoxy-2-(hexanoylethyl)phenyl]hexanoic acid ($M/e = +378$, $\gamma_{max.}^{CHCl_3} = 1706$ cm.$^{-1}$).

EXAMPLE 2

6-[2-(3-hydroxyoctyl)-3,5-dimethoxyphenyl]hexanoic acid and sodium salt

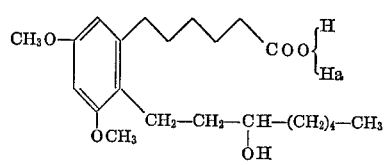

The crude product obtained in STEP E of Example 1 in the amount of 7.5 g. is dissolved in a mixture of 20 ml. of 1N aqueous sodium hydroxide and 75 ml. of water. Under stirring at 5° C. there is gradually added 5.0 g. of sodium borohydride and the resulting mixture is stirred for 18 hours at 5° C. The mixture is then carefully acidified with 6N hydrochloric acid and extracted with ethyl acetate/diethyl ether (1:1). The extract is evaporated in vacuo to obtain a crude gum-like product which is purified by column chromatography using silica gel to obtain an oil of 6-[2-(3-hydroxyoctyl - 3,5 - dimethoxyphenyl] hexanoic acid (Analysis: Calcd., C, 69.4; H, 9.5. Found: C, 69.2; H, 9.8).

A portion of the oil obtained immediately above is dissolved in a theoretical volume of 1N sodium hydroxide solution and evaporated to dryness to obtain 6-[2-(3-hydroxyoctyl)-3,5-dimethoxyphenyl]hexanoic acid sodium salt; m.p. 92–96° C.

EXAMPLE 3

The crude product obtained in STEP E of Example 1 is chromatographed as indicated in Example 1 and the more polar band ($R_+ \cong 0.4$) eluted with ethyl acetate followed by evaporated *in vacuo* to obtain an oil of 6-[2-(3-hydroxyoctyl-3,5-dimethoxyphenyl]hexanoic acid $$(M/e = +380)$$

What is claimed is:

1. A compound of the formula

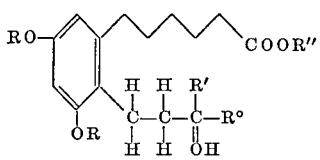

wherein
R° is straight chain alkyl of 4 to 6 carbon atoms,
R'' is hydrogen or a cation forming a pharmaceutically acceptable salt,
R' is hydrogen or alkyl of 1 to 3 carbon atoms, and
both R which are the same, are hydrogen or alkyl of 1 to 3 carbon atoms.

2. A compound of claim 1 in which R° is pentyl and R' is hydrogen.
3. A compound of claim 2 in which R is methyl.
4. The compound of claim 3 in which R'' is hydrogen.
5. The compound of claim 3 in which R'' is sodium.

6. A compound of the formula:

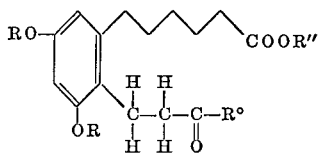

wherein
R° is straight chain alkyl of 4 to 6 carbon atoms,
R'' is hydrogen or a cation forming a pharmaceutically acceptable salt, and
both R which are the same, are hydrogen or alkyl to 1 to 3 carbon atoms.

7. A compound of claim 6 in which R° is pentyl and R is methyl.

References Cited

Collet et al.: Chem. Ther. 5 (3) 163 (1970).
Sharma et al.: C.A. 72, 78568X (1969).
Lardelli et al.: C.A. 67, 32309g (1967).
Morim et al.: C.A. 70, 37249j (1968).

LORRAINE A. WEINBERGER, Primary Examiner

J. F. TERAPANE, Assistant Examiner

U.S. Cl. X.R.

260—448.2 B, 501.1, 520, 590, 600, 613 R, 613 D, 621 R; 424—316, 331 341 346